United States Patent [19]

Reh et al.

[11] 4,226,844
[45] Oct. 7, 1980

[54] METHOD OF THERMALLY SPLITTING HYDRATE OF ALUMINUM CHLORIDE

[75] Inventors: Lothar Reh, Bergen-Enkheim; Ludolf Plass, Kronberg, both of Fed. Rep. of Germany; Philippe Marchessaux, Aix en Provence, France; Raman Sood, Kingston, Canada

[73] Assignee: Aluminum Pechiney, Lyon, France

[21] Appl. No.: 9,115

[22] Filed: Feb. 5, 1979

[30] Foreign Application Priority Data

Feb. 13, 1978 [DE] Fed. Rep. of Germany ..... 28059065

[51] Int. Cl.³ ................................................ C01F 7/30
[52] U.S. Cl. ........................................ 423/625; 34/10; 423/481; 423/DIG. 16
[58] Field of Search ............... 423/625, DIG. 16, 481; 34/10

[56] References Cited

U.S. PATENT DOCUMENTS

| 4,049,788 | 9/1977 | Bierbach et al. | 423/DIG. 16 |
| 4,080,437 | 3/1978 | Reh et al. | 423/DIG. 16 |
| 4,091,085 | 5/1978 | Reh et al. | 423/DIG. 16 |
| 4,107,281 | 8/1978 | Reh et al. | 423/DIG. 16 |

FOREIGN PATENT DOCUMENTS 2503142 7/1976 Fed. Rep. of Germany ... 423/DIG. 16

OTHER PUBLICATIONS

Reh, "Chemical Eng. Progress", vol. 67, 1971, pp. 58–63.

Primary Examiner—Herbert T. Carter
Attorney, Agent, or Firm—McDougall, Hersh & Scott

[57] ABSTRACT

Thermally splitting hydrate of aluminum chloride to produce aluminum oxide wherein the hydrate is at least partially split by contact with hot gases and hot calcined product in a turbulent zone, transmitting the material from the turbulent zone into a residence zone, recycling a portion of the solids from the residence zone to the turbulent zone in an amount to maintain a desired suspension density while the remainder is passed to a turbulent cooling zone in heat exchange with the fluidizing gas introduced into the turbulent zone.

15 Claims, 2 Drawing Figures

METHOD OF THERMALLY SPLITTING HYDRATE OF ALUMINUM CHLORIDE

The invention relates to a method of thermally splitting hydrate of aluminum chloride with calcination to form aluminum oxide, using a turbulent state with a greatly expanded turbulent layer, combined with an upward gradient in the solids concentration and discharge of solids together with the gases from the upper part of the reactor stack (the turbulent zone), wherein the hydrate of aluminum chloride is fed into contact with gases before entering the turbulent zone, for the purpose of at least partial splitting, and is then advanced to the turbulent zone; wherein the solids are discharged with the gases from the top of the turbulent zone and advanced to a residence zone fluidized at a low gas velocity, from which a fractional stream of solids is recycled to the turbulent zone in a controlled manner in order to establish a given suspension density, and a further fractional stream, after an adequate residence time, is conveyed to turbulent cooling means operated with oxygen-containing gas as the fluidizing gas; and wherein at least part of the heated fluidizing gas issuing from the turbulent cooling means is passed as a secondary gas to the turbulent zone above the fluidizin gas inlet, and the turbulent zone is heated by supplying fuel to the zone between the fluidizing gas inlet and the secondary gas inlet.

Processes in the "conventional" turbulent layer are known for thermally splitting hydrate of aluminum chloride; that is to say, the processes employ a dispersed state, in which a dense phase is separated from the gas or dust chamber above it by a clear jump in density (German DT-OS No. 1,667,195 and OS No. 2,261,083). A method which makes use of a so called large expanded turbulent layer is also known for this purpose (German DT-OS No. 1,767,628). As described, there are states of dispersion without any defined upper boundary layer. They are obtained by setting a substantially higher gas velocity than is allowable in order to maintain a conventional turbulent layer, a velocity at which the solid would rapidly be carried out of the reactor by the gas if new material were not constantly added. The solids concentration is lower than in the bed but considerably higher than in the dust chamber of a conventional turbulent layer. There is no increase in density between the dense phase and the dust chamber above it, and yet the solids concentration decreases continuously from the bottom to the top of the reactor.

The method of German DT-OS No. 1,767,628, particularly enables the heat from discharged gas and discharged solids to be used extensively, so that maximum utilization of fuel, i.e. optimum heat consumption can be achieved. By providing combustion in two stages, i.e. firstly only with fluidizing gas in less than the stoichiometric proportion in the high dispersion density range, then in the presence of secondary gas in the stoichiometric proportion or slightly higher, overheating of isolated parts of the turbulent bed can be avoided. Very constant temperatures and exact control of temperatures are possible.

In spite of these great advantages, the known method, as applied to the splitting of hydrate of aluminum chloride, has a disadvantage when high minimum residence times in the reactor system are required for the aluminum oxide formed, for reasons of reaction technique, e.g. because of changes of phase or in order to obtain a very pure product. It is true that a high minimum residence time can be obtained in the known process by increasing the height of the furnace, but this increases the pressure drop in the turbulent layer reactor and thus the energy requirement.

In another known method, this disadvantage is avoided by letting the solids separated from the gas into a residence time reactor fluidized at a low gas velocity, by recycling a fractional stream of solids to the turbulent layer furnace in a controlled manner, in order to establish a given suspension density, and by feeding a further fractional stream to the turbulent cooler after an adequate residence time (DT-OS No. 2,524,541). The method is thus carried out in a system (which forms the main feature of the process) substantially comprising a turbulent layer reactor and a residence time reactor, the individual phases of the total reaction being assigned to the two reactors according to the technical requirements of the reaction. In the splitting process, the step of heating the particles consumes most of the heat requirement, and this step is carried out in the turbulent layer reactor (main reaction). To obtain the final quality of product takes a relatively longer time (post reaction time) than the main reaction, e.g. because of changes of phase or diffusion processes, and requires only a small intake of heat; this is done in the residence time reactor.

A disadvantage of the last mentioned process is that, because of the specified energy requirement and thus the requirement for fuel and for oxygen-containing gases necessary for combustion, the waste gas obtained has a relatively low hydrogen chloride concentration within high volumes of gas. It therefore requires absorption plant expensive apparatus and large quantitites of cooling medium to dissipate the heat from the waste gas.

In the process known from DT-OS No. 1,767,628, an added disadvantage is that, in calcination to aluminum oxide, the required relatively long residence time necessitates consuming a considerable amount of energy owing to the recirculation of solids.

It is an object of this invention to provide a method which will avoid the known disadvantages, particularly those mentioned above, which will produce aluminum oxide of high quality, and which will generate a waste gas with a relatively high content of hydrogen chloride.

These and other objects and advantages of this invention will hereinafter appear, and for purposes of illustration, but not of limitation, embodiments of the invention are shown in the accompanying drawings, in which.

Figure 1:
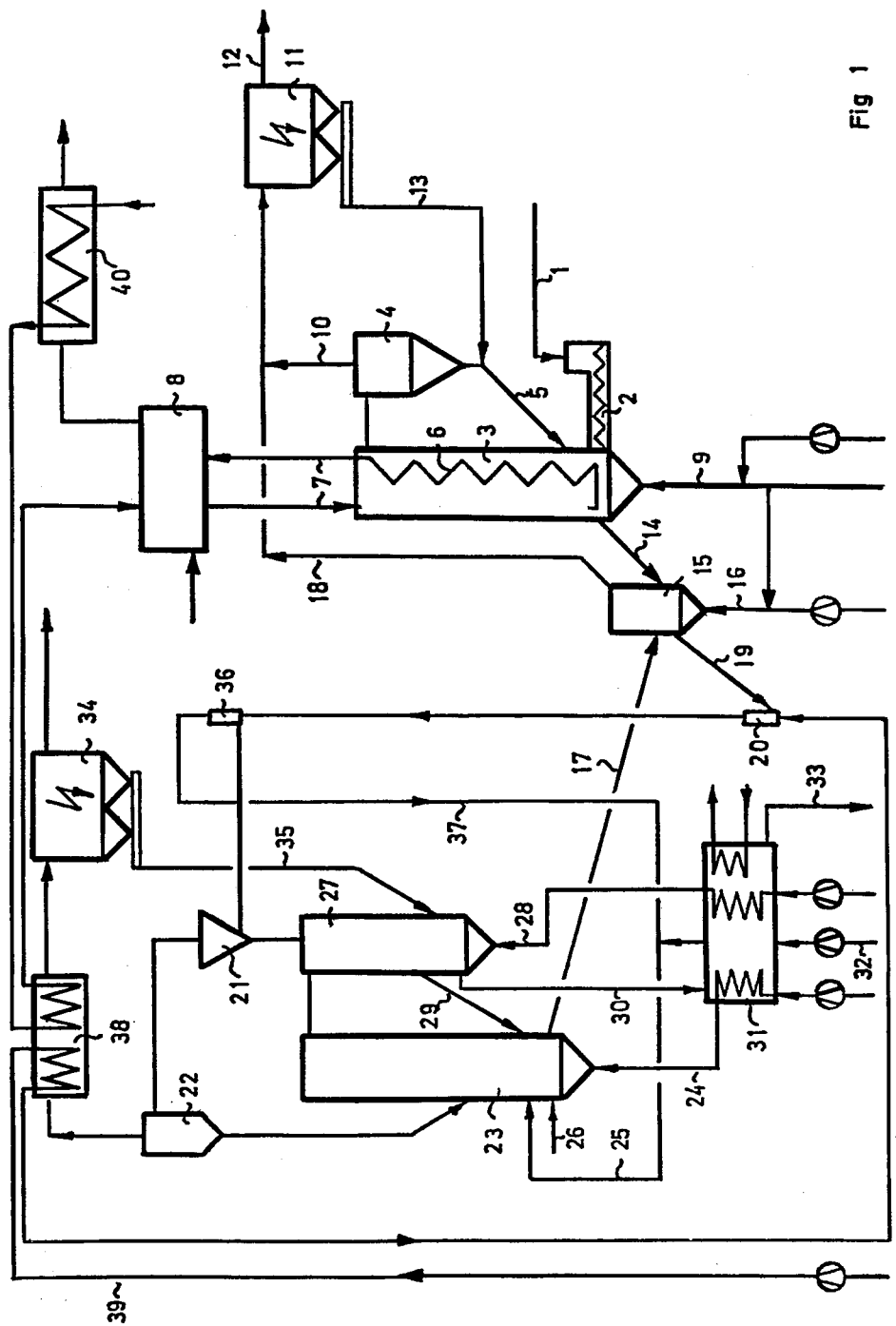
FIG. 1 is a flow diagram which illustrates the process of this invention.

According to the invention, the method of the above mentioned type comprises bringing the hydrate of aluminum chloride feed into contact with gases in the turbulent state, with hot calcined material involved in the process being supplied, and at least partially to split the hydrate.

In the preparation of high-concentration hydrogen chloride by calcining thermally decomposable metal chlorides, it is indeed known from Austrian specification 315,207 to apply indirect heating by admixing solid, pre-heated heat carriers, which may consist of the actual material being calcined. However, this prior teaching does not suggest proceeding in the manner of the invention, since the assumption was that with splitting at the comparatively low temperatures prevailing in the turbulent layer, the freshly fed hydrate of aluminum chloride would adhere strongly to the material being calcined. As a result, the stream of material fed in compact form would not dissolve and an orderly turbulent layer state could not be obtained, or the orderly turbulent movement present at the initial stage would collapse shortly after the addition of hydrate of aluminum chloride. Nor was the above function contradicted by the mode of operation described in DT-OS No. 25 24 541, where the hydrate of aluminum chloride was placed on suspended exchangers, for obtaining completely different operating conditions, owing to the high gas velocity and high gas temperature at the place where the hydrate of aluminum chloride is fed in. In addition, the hydrate of aluminum chloride is brought into contact with a substantially pure stream of gas and not with a third coreagent, the hot calcined material.

In the method of the invention, the heat energy required for splitting may be provided virtually exclusively by hot calcined material. However, it is also possible for splitting to take place in two stages, in which case the heat in the first stage is desirably supplied through heated surfaces and in the second stage by feeding in calcined material.

The particular advantage of the last mentioned embodiment is that a substantial proportion of the splitting and evaporating energy is supplied by means of fluid heat carriers used to heat the hot surfaces, and the quantity of calcined material recirculated can be minimized. As compared to the exclusive use of hot surfaces to supply the necessary heat, the particular advantage of the two stage mode of operation is that higher temperatures at the splitting stage are possible than would otherwise normally be possible when hot surfaces are used.

The quantity of calcined material required for the splitting process depends firstly on the heat energy made available per unit of mass, and secondly on the energy requirement; this is made up of the splitting and evaporating energy and the increase in sensible heat, and can easily be calculated. In the embodiment of the invention, with splitting in two stages, the heat energy introduced through the heating surfaces is obviously deducted.

In both embodiments, i.e., with splitting in one or two stages, the turbulent state in which hydrogen chloride is split off may correspond to that of a conventional turbulent layer, preferably with an average suspension density of 300 to 600 kg/m$^3$ and a turbulent gas velocity of less than 0.8 m/sec., or of an expanded turbulent layer with re-cycling of solids (circulating turbulent layer), preferably with an average suspension density of 40 to 250 kg/m$^3$ and a turbulent gas velocity of 1.5 to 5 m/sec.

With regard to two-stage splitting with heat being supplied through heating surfaces, an advantage of using a conventional turbulent layer resides in the high heat transfer values, due to the high suspension density. A disadvantage is that, because of the low eddying intensity, caking may take place, leading to local defluidization. Where an expanded turbulent layer with recirculation of solids is used, caking is definitely avoided. In addition, the draw back of the lower heat transfer values is largely compensated for by the possibility of the high rate of circulation.

The above mentioned turbulent gas velocity relates to the effective velocity of the gas produced in indirect splitting. It substantially comprises a mixture of the fluidizing gas used, the vapor formed from humidity introduced and water of crystallization, and the hydrogen chloride obtained by chemical reaction of the aluminum chloride and evaporation of physically adhering hydrogen chloride. The gas velocity applies to the splitting reactor free of any turbulent material.

Small quantities of possibly pre-heated foreign gases, preferably steam, may be used to operate the turbulent bed or beds.

Where splitting takes place in two stages, indirect heating in the first stage is preferably provided by heating surfaces suspended in the reactor and impinged on by fluid heat carrier such as fused salts or oils. The heat carriers may be heated by conventional burners, although the heat in the reduced calcined material may also be used for this purpose. Bundles of tubes are particularly advantageous for transferring the heat. With a conventional turbulent layer, it is advisable to arrange the bundles of tubes so that the tubes extend horizontally, and with a circulating turbulent layer so that they extend vertically in order to reduce erosion. The supply of heat carrier, fluidizing gas and hydrate of aluminum chloride should be adjusted so that the temperature of the bed of turbulent material in the first stage is from 150° to 300° C., in accordance with the preferred embodiment of the invention.

In the second stage of splitting, in which calcined material is introduced, higher splitting temperatures of up to approximately 600° C. should be used, so as to minimize the quantity of hydrogen chloride introduced with the solid into the calcining stage.

With single-stage splitting, operating exclusively by the introduction of calcined material, temperatures should be within the range of 200° to 450° C.

Regardless of the embodiments selected at the splitting stage, the residence time and temperature of the turbulent material should preferably be chosen so that the degree of splitting obtained is at least 80%.

A stream of turbulent material is continuously withdrawn from the splitting zone and fed into the calcining zone. Here the particles, which are substantially within the range from 200 to 300 $\mu$m (relative to the average particle size dp 50), are heated very rapidly owing to the high temperatures prevailing in the turbulent layer reactor (turbulent zone). Because of their high specific surface area, they very rapidly split the remaining chloride, giving off hydrogen chloride. This has substantially taken place by the time the particles first leave the turbulent zone and before they enter the residence zone. The rapid heating is the result of intensive supply of heat due to the turbulent state prevailing in the turbulent zone. At the same time, the product is protected on account of the two-stage and hence gentle, altogether near-stoichiometric, combustion. The changes of phase, which occur during calcination of the aluminum oxide, and which require comparatively little energy but long times of residence, then take place in the residence zone. This is an economic advantage and also protects the product apparatus. The residence zone may be fluidized with steam and/or air.

The quantity of solids recycled from the residence zone is just sufficient to set the suspension density in the turbulent zone and possibly to avoid any appreciable differences in temperature throughout the turbulent zone/residence zone system.

Operating conditions in the turbulent zone and the recycling of solids from the residence zone (taking into account the supply of fresh material) are preferably selected so as to give an average suspension density of 20 to 300 kg/m³ in the zone between the gas distributor and the secondary gas inlet and a density of 1 to 20 kg/m³ in the zone above the secondary gas inlet.

Under the above mentioned conditions, there is a pressure drop in the turbulent zone of approximately 250 to 900 mm water column.

If these operating conditions for the turbulent zone are defined by the formulas of Froude and Archimedes, the following ranges are obtained.

$$0.1 < \tfrac{3}{4} \cdot Fr^2 \frac{\rho g}{\rho k - \rho g} < 10$$

and $$0.1 < Ar < 100$$

wherein $$Ar = \frac{d_K^3 \cdot g (\rho k - \rho g)}{\rho g \cdot \nu^2}$$

In the formulas:
Fr is the Froude number
Ar is the Archimedes number
$\rho g$ is the density of the gas in kg/m³
g is the gravitation constant in m²/sec.
$\rho k$ is the density of the particle of solid in kg/m³
$d_k$ is the diameter of the spherical particle in meters
$\nu$ is the kinematic viscosity in m²/sec.

The suspension density in the residence zone is accordingly considerably higher, on account of the low velocity of the fluidizing gas, the purpose of which is substantially only to mix the solids. To use the residence time reactor to the fullest, the suspension density should be over 500 kg/m³.

In the definition in terms of Froude and Archimedes there is: the same range of Archimedes numbers as in the turbulent zone and a Froude number corresponding to $$\tfrac{3}{4} a Fr^2 \cdot \frac{\rho g}{\rho k - \rho g} < 5 \cdot 10^{-3}$$

The relative size of the turbulent and residence zones is determined substantially by the average total residence time required to obtain a given quality of product. It is generally advantageous for the average residence time of the solids in the turbulent zone to be from 10 to 30 minutes and that in the residence zone to be from 2 to 20 times as long.

In defining the average residence time in the turbulent zone, the quantity of solids recycled from the residence zone is included; this can be calculated from the sum of average suspension densities in both zones, relative to the amount of product per hour. The choice of the quantities of fluidizing and secondary gas and particularly the division between the two streams of gas and the height of the secondary gas intake provide additional means of regulation.

In another preferred embodiment of the invention, the secondary gas is supplied at a level approximately 10 to 30% of the total height of the turbulent zone. The volume ratio of secondary gas supplied from the turbulent zone to fluidizing gas is desirably from 10:1 to 1:2.

If only a small quantity of solids have to be recycled from the residence zone in order to obtain the requisite suspension density in the turbulent zone, but a comparatively long total residence time is desired, it is advisable to provide additional heating in the residence zone by direct supply of fuel. With regard to the temperature in the system, the circulation does not then completely cover e.g. the radiation losses from the residence zone but is used merely for precision adjustment.

After an adequate residence time, a fractional stream of solids is conveyed to turbulent cooling, which is preferably carried out in a plurality of cooling chambers through which it can flow in succession. The oxygen-containing fluidizing gases used to maintain the operative state are at least partially fed to the turbulent zone as a secondary gas. The turbulent cooler may additionally be fitted with cooling registers or coils which dip into the chambers and in which e.g. fluidizing gas for the turbulent zone and possibly for the residence zone is heated.

The quantites of gas fed to the zones are preferably selected so that the turbulent gas velocity in the calcining zone is from 3 to 15 m/sec. and preferably from 4 to 10 m/sec., and the turbulent gas velocity in the residence zone is from 0.1 to 0.3 m/sec., each relative to the empty reactor.

The operating temperatures in the turbulent zone and residence zone may be selected within broad limits, depending substantially on the quality of product required. They may be within a range from about 650° to 1050° C.

Air may be used as the fluidizing and secondary gas which in all cases contains oxygen. In view of the small quantities of gas discharged, it may be advantageous to use gases rich in oxygen, possibly with up to 70% by volume of oxygen, as the fluidizing and/or secondary gas.

The invention will now be explained in greater detail, by way of example, with reference to the drawings.

In the process illustrated in FIG. 1, the hydrate of aluminum chloride is split in two stages. For this purpose the hydrate is placed in the turbulent layer reactor 3 by means of the feeder 1 and belt-type weighing machine 2. The reactor 3 is designed as a circulating turbulent layer connected with a separator 4 and recycle pipe 5. It is heated by surfaces 6, which are connected to the heater 8 by a closed heat carrying circuit 7. The fluidizing gas is steam supplied to the bottom of the reactor 3 through a pipe 9. The waste gas from the reactor 3 passes through a pipe 10 into an electrostatic filter separator 11 and finally to the waste gas pipe 12, which leads into the installation for absorbing the hydrogen chloride (not shown). Dust separated in the filter 11 is returned to the reactor 3 through a pipe 13. A fractional stream of partially split aluminum chloride is passed from the circulating turbulent layer in reactor 3, through a pipe 14 to the second splitting reactor 15, which is operated as a conventional turbulent layer. The reactor is fed with steam supplied through a pipe 16 and with calcined material supplied through a pipe 17. The waste gas passes through a pipe 18 to the electric filter 11.

The product is discharged from the second splitting reactor 15 through a pipe 19 into a pneumatic conveyor 20 which carries it to a separator 36. The pneumatically conveyed solid is then passed to the venturi cyclone 21, while the stream of gas is dispatched through a pipe 37. In the venturi cyclone 21, the aluminum chloride, which is at least partially split, is picked up by the gas stream from the turbulent/residence zone and is separated from the gas in the separator 22 and taken to the turbulent zone 23. The turbulent zone 23 is operated with a fluidizing gas supplied through a pipe 24 and secondary gas supplied through a pipe 25. Fuel, consisting particularly of heating oil or heating gas, is fed in through lances 26.

The solids which are discharged from the turbulent zone 23, as a result of the operating conditions prevailing therein, are separated from the gas in the upper part of the residence zone 27 and passed into the lower part, which is slightly fluidized through the supply of gas from a pipe 28. Solids are recycled to the turbulent zone 23 in a controlled manner through a pipe 29; calcined material is recycled to the second reactor 15 through pipe 17; and fully calcined aluminum oxide is removed through a discharge pipe 30. This fractional stream is fed to the turbulent layer cooler 31, which is fluidized with oxygen-containing gas supplied through a pipe 32. The gas which leaves the cooler 31 through a pipe 25 is introduced into the turbulent zone 23 as a secondary gas. Cooled aluminum oxide is finally removed from the residence zone 27 through a pipe 33.

The gas discharged from the seaprator 22 passes through a heat exchanger 38. The first stage of the exchanger heats air for pneumatic conveying, supplied through a pipe 39, and the second stage heats combustion air for the burners of the heater 8. After passing through the heat exchanger 38, the gas is freed from dust in the electrostatic filter separator 34. The dust accumulating in the filter 34 is passed through a pipe 35 back to the residence zone 27.

The streams of gas which are supplied to the turbulent/residence zone 23; 27 through pipes 25 and 28 respectively are previously heated in the turbulent layer cooler 31, while cooling the hot calcined material. The pipe 25 additionally picks up the gas which comes from the separator 36 and is drawn off through the pipe 37.

A further heat exchanger 40 is finally provided downstream of the heater 8 on the gas side. In this exchanger, heat from the waste gas is transferred to freshly supplied air destined for the burners of the heater 8.

Figure 2:
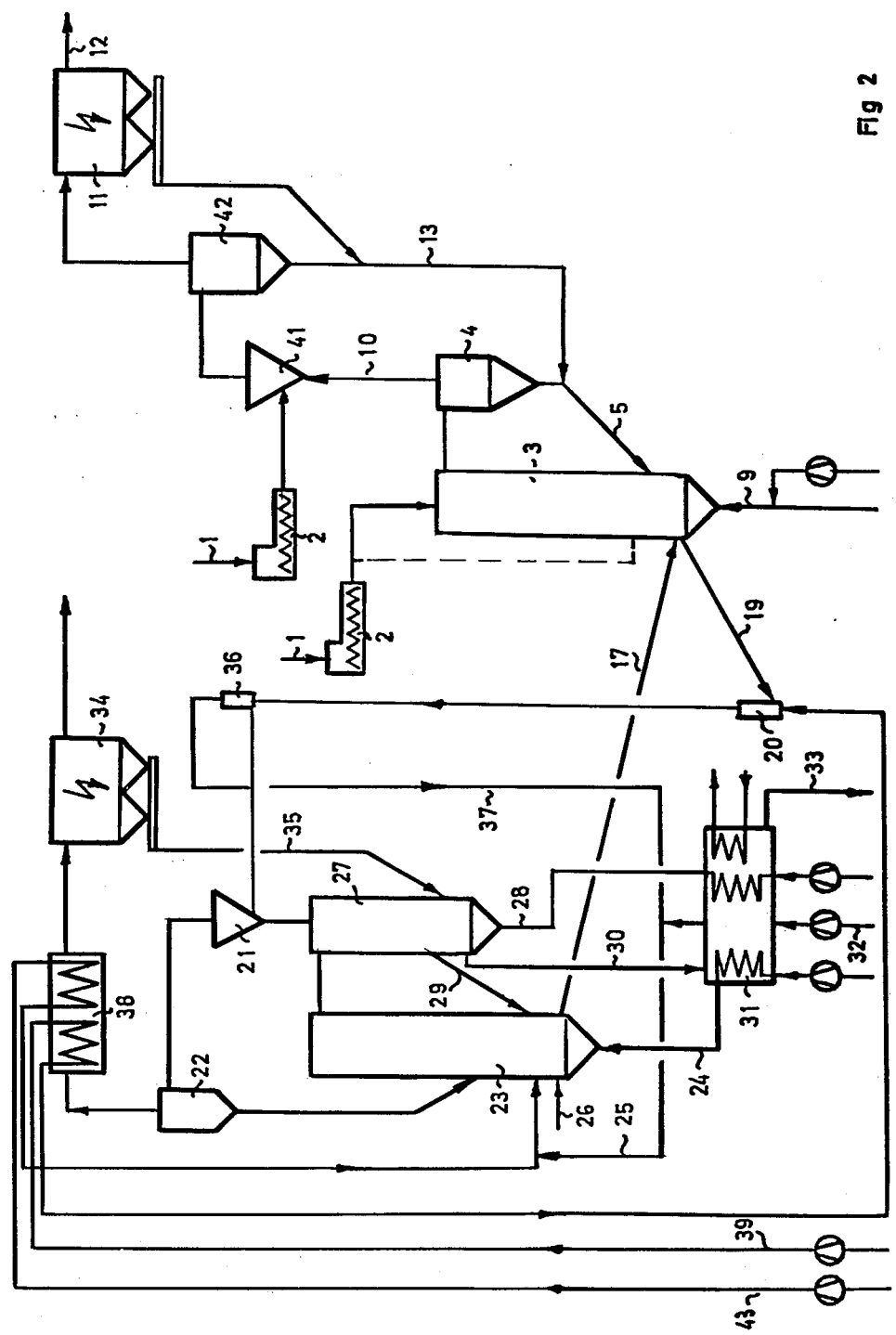
FIG. 2 is a flow diagram illustrating a ramification of the invention.

In the FIG. 2 embodiment of the invention, the hydrate of aluminum chloride is split in a splitting stage which is operated as a circulating turbulent layer with a turbulent layer reactor 3, separator 4, venturi cyclone 41 downstream on the gas side and separator 42. The hydrate is fed, by means of feeders 1 and belt type weighing machines 2, partly to the turbulent layer reactor 3 and partly to the venturi cyclone 41 (in order to cool the discharged gas). This fractional stream then also reaches the reactor 3 via the seaprator 42 and pipes 13 and 5. Heat is supplied by hot calcined material recycled through a pipe 17. The fluidizing gas is steam which is supplied to the reactor 3 through a pipe 9. The gas discharged therefrom is passed through a pipe 10, venturi cyclone 41 and separator 42 into electric filter 11, where it is freed from dust. The dust is returned to the reactor 3 through a pipe 13, and the gas is sent to the installation for absorbing hydrogen chloride (not shown).

From the circulating turbulent layer reactor 3, the partially split aluminum chloride is passed through a pipe 19 into a pneumatic conveyor 20, through which it is transported into a separator 36.

The method of feeding into the turbulent zone 23 and the operating conditions in respect of the turbulent zone 23, residence zone 27 and cooler 31 are the same as in FIG. 1.

Since the FIG. 2 process envisages that the hydrate should be split merely with recycled calcined material, the heating surfaces, heater 8 etc. can be dispensed with. Instead, an additional stream of fresh air, which is supplied through a pipe 43 and acts as additional secondary air for the turbulent zone 23, is heated in the heat exchanger 38.

EXAMPLE 1

(Referring to FIG. 1)

54 Tons (t) an hour of $AlCl_3.6H_2O$ with surface humidity of approximately 15% and an average particle diameter $dp_{50}$ of 150 μm was fed into the turbulent layer reactor 3 by means of a feeder 1 and belt type weighing machine 2. The internal diameter of the reactor was 3.0 m and its height 18 m.

The turbulent layer reactor 3 was operated with 3000 $Nm^3/h$ steam at 180° C., supplied through a pipe 9. The reactor 3 was heated with a fused alkali chloride mixture, which was introduced at 460° C. and discharged at 420° C. by the circuit 7. The fused salt was reheated in the heater 8 by burning 2850 kg/h of heavy heating oil with a heating power of $H_u = 39\,800$ kJ/kg.

A temperature of 200° C. was established in the turbulent layer reactor 3. The velocity of the turbulent gas was 2.0 m/sec. As a result of the high velocity of the gas, a high proportion of the solids was carried out together with the gas at the upper part of the reactor 3. After separation in the downstream separator 4, the solids were returned to the reactor 3 through the pipe 5. As a result of the recycling of solids to the reactor 3 and the operating conditions selected for it, an average suspension density of approximately 150 $kg/m^3$ and a pressure drop of 2700 mm water column were established in the reactor 3. The average residence time was approximately 1.7 hours. On the basis of the above mentioned conditions, approximately 80% of the aluminum chloride was split.

22.4 t/h of solids was transferred to the splitting reactor 15 through the pipe 14. The reactor had an internal diameter of 4.6 m. The height of the turbulent layer was 5.0 m. 1000 $Nm^3/h$ steam at 180° C. was introduced through the pipe 16. As a result of the recycling of calcined material to the pipe 17, at a rate of 46 t/h at 950° C., a temperature of 500° C. was provided in the reactor 15. The velocity of the turbulent gas was 0.5 m/sec. The average suspension density was 400 $kg/m^3$ and the average residence time 35 min. 12,050 $Nm^3/h$ waste gas at 500° C. was carried away through the pipe 18 and taken to the electric filter 11 for dust removal, together with the waste gas at 200° C. discharged through the pipe 10 at 30,000 $Nm^3/h$. The concentration of hydrogen chloride was 34.6% and the gas temperature 290° C.

58 t/h of solids was taken from the splitting reactor 15. The degree of splitting achieved was 99.6% relative to the feed of fresh hydrate of aluminum chloride. The solids were carried pneumatically into the separator 36 by means of the apparatus 20, using 2900 $Nm^3/h$ of air preheated to 500° C. in the heat exchanger 38. The solids passed into the venturi cyclone 21, were picked up by the gas discharged from the turbulent/residence zone 23 and 27, present in quantities of 17,000 and 23 $Nm^3/h$, and conveyed to the separator 22. The gas discharged, which has a temperature of 950° C. before leaving the turbulent/residence zone 23 and 27, was cooled to 700° C., particularly through contact with the solids and was conveyed to the heat exchanger 38.

The remainder of the process of splitting the aluminum chloride with calcination to form aluminum oxide took place in the turbulent zone 23 and residence zone 27. In the turbulent zone 23 the internal height of the reactor was 14 m and the internal diameter 2.2 m, while in the residence zone 27, in the lower, cylindrical portion, the internal diameter was 3.5 m and the height 3.4 m (relative to the turbulent bed).

The turbulent zone 23 was fluidized by air, supplied in quantities of 4,225 Nm³/h to the pipe 24 and the gas distributor. The air had been pre-heated to 550° C. in the turbulent layer cooler 31 by indirect heat exchange. 8,500 Nm³/h of air, consisting of 2,900 Nm³ at 500° C. through the pipe 37 and 5,600 Nm³ at 600° C. from the cooler 31, was fed through the pipe 25 to the turbulent zone 23 and introduced as a secondary gas 2.5 m above the gas distributor. The ratio of fluidizing gas to secondary gas was thus 1:2.0. 1,160 kg heavy heating oil ($H_u = 39\,800$ kJ/kg) was sprayed with lances 26 into the region between the gas distributor and the secondary air pipe 25. Combustion was incomplete in this region. Complete burning took place above the secondary gas intake through the pipe 25.

The solids discharged from the turbulent zone 23 were separated from the gas in the upper part of the residence zone 27, passed into the lower portion thereof and there formed a dense turbulent bed.

The residence zone 27 was fluidized with 1,100 Nm³/h of air which had been preheated to 500° C. in the cooler 31.

As a result of the circulation of solids in the turbulent zone and the recycling of solids from the residence zone 27 to the pipe 29, a uniform temperature of 950° C. was set up throughout the circuit.

The total residence time of the aluminum oxide, approximately 1.96 hour, was divided between the turbulent zone 23 and residence zone 27 in a ratio of about 1:11 (10 minutes turbulent zone 23, 1.8 hour residence zone 27). The drop in pressure in the turbulent zone 23 was set to approximately 430 mm water column. The average suspension density in the region between the gas distributor and the secondary gas pipe 25 was about 150 kg/m³, and the average suspension density above the pipe 25 about 5 kg/m³. The suspension density in the part of the residence zone 27 filled with solids was approximately 550 kg/m³.

The product, amounting to 10 t/h of aluminum oxide was conveyed from the residence zone 27 through the pipe 30 into the turbulent layer cooler 31. The cooler had been fluidized with 5,600 Nm³/h air and impinged on with 4225 Nm³/h and 1100 Nm³/h respectively in cooling registers, while the aluminum oxide was cooled to 100° C. with the aid of additional cooling by water.

The air streams, preheated to 550° and 500° C. respectively by indirect heating, were applied to the purpose previously described.

The gas discharged from the electric filter 34 at 17,023 Nm³/h had a temperature of 300° C. and an HCl content of 0.25% by volume.

The combustion air, required in quantities of 34,400 Nm³/h to operate the heater 8, was heated to 250° C. in the heat exchanger 40 and to 500° C. in the heat exchanger 38.

EXAMPLE 2

(Referring to FIG. 2)

54 t/h of AlCl₃·6H₂O with a surface humidity of approximately 15% and an average particle diameter $dp_{50}$ of 150 μm was fed into the turbulent layer reactor 3 through the feeder 1 and belt type weighing machine 2, and supplied to the reactor 3 and venturi cyclone 41 in a ratio of 40:1. The internal diameter of the reactor 3 was 5.5 m and its height 18 m.

The reactor 3 was operated with 3,000 Nm³/h steam at 180° C., supplied through the pipe 9. The reactor 3 was heated by introducing 180 t/h of calcined material at 950° C., supplied through the pipe 17.

A temperature of 400° C. was maintained in the reactor 3. The velocity of the turbulent gas was 4.6 m/sec. Owing to the high gas velocity a large proportion of the solids were discharged from the top of the reactor 3 together with the gas. Following separation in the downstream separator 4, the solids passed through the pipe 5 back to the reactor 3. As a result of the recycling of solids to the reactor 3 and the operating conditions selected for it, an average suspension density of approximately 100 kg/m³ and a pressure drop of 1,800 mm water column were established in the reactor 3. The average residence time was about 0.5 h. On the basis of these conditions, approximately 98% of the aluminum chloride was split.

38,400 Nm³/h of gas discharged from the separator 42 was fed to the electric filter 11 for dust removal. The concentration of hydrogen chloride was 37% and the gas temperature 250° C.

194 t/h of solids was removed from the splitting reactor 3 and conveyed pneumatically to the separator 36 by means of the apparatus 20, using 9,700 Nm³/h of air preheated to 400° C. in the heat exchanger 38. The solids passed into the venturi cyclone 21, were picked up by gas from the turbulent/residence zone 23 and 27, present in quantities of 45,000 Nm³/h, and passed into the separator 22. The gas discharged, which had a temperature of 950° C. before leaving the turbulent/residence zone 23 and 27, was cooled to 640° C., particularly through contact with the solids, and was fed to the heat exchanger 38.

The remaining process of splitting the aluminum chloride with calcination to form aluminum oxide took place in the turbulent zone 23 and residence zone 27. In the turbulent zone 23, the internal height of the reactor was 16 m and the internal diameter 3.5 m, while in the residence zone 27, in the lower, cylindrical portion, the internal diameter was 3.5 m and the height 3.4 m (relative to the turbulent bed).

The turbulent zone 23 was fluidized by means of air, in quantities of 5,000 Nm³/h supplied through the pipe 24 and the gas distributor, the air having been pre-cooled to 550° C. in the turbulent layer cooler 31 by indirect heat exchange. 36,230 Nm³/h of air, including 9,700 Nm³/h supplied at 400° C. through the pipe 37, 5,600 Nm³/h supplied at 600° C. from the cooler 31 and 20,930 Nm³/h supplied at 500° C. through the pipe 43 and heat exchanger 38, were fed to the turbulent zone 23 through the pipe 25 and introduced as a secondary gas 4.0 m above the gas distributor. The ratio of fluidizing gas to secondary gas was thus 1:7.2. 3,570 kg heavy heating oil ($H_u = 39\,800$ kJ/kg) was sprayed through lances 26 into the region between the gas distributor and the secondary air pipe 25. Combustion in this region was incomplete. More complete burning took place above the intake of secondary gas through the pipe 25.

The solids taken out of the turbulent zone 23 were separated from the gas in the upper part of the residence zone 27, passed into the lower part of it and there formed a dense turbulent bed.

The residence zone 27 was fluidized with 1,100 Nm³/h of air which had been preheated to 400° C. in the cooler 31.

As a result of the circulation of solids in the turbulent zone 23 and the recycling of solids from the residence zone 27 through the pipe 29, a uniform temperature of 950° C. was set up throughout the circuit.

The total residence time of the aluminum oxide, approximately 2.26 hours, was divided between the turbulent zone 23 and residence zone 27 in a ratio of approximately 1:3.8 (38 minutes turbulent zone 23, 1.8 hours residence zone 27). The pressure drop in the turbulent zone 23 was about 660 mm water column. The average suspension density in the region between the gas distributor and the secondary gas pipe 25 was about 150 kg/m$^3$ and the average suspension density above the pipe 25 about 5 kg/m$^3$. The suspension density in the part of the residence zone 27, filled with solids, was approximately 550 kg/m$^3$.

The product, 10 t/h of aluminum oxide, was taken out of the residence zone 27, through the pipe 30 and into the cooler 31. The cooler had been fluidized with 5,600 Nm$^3$h of air and impinged on in cooling registers with 5,000 Nm$^3$/h and 1100 Nm$^3$/h respectively, and it cooled the aluminum oxide to 100° C. with the aid of additional cooling by water. The air streams preheated to 500° and 400° C. respectively by indirect heating were applied to the purpose previously described.

The gas emerging from the electric filter 34 at 45,000 Nm$^3$/h had a temperature of 350° C. and an HCl content of 0.5% by volume.

It will be understood that changes may be made in the details of the compositions and conditions, without departing from the spirit of the invention, especially as defined in the following claims.

We claim:

1. A method of thermally splitting hydrate of aluminum chloride to form aluminum oxide using a splitting zone, a separate turbulent zone, and a separate residence zone and a cooling zone comprising:
   (1) feeding the hydrate of aluminum chloride into the splitting zone;
   (2) fluidizing the hydrate of aluminum chloride while in the splitting zone by the introduction of a fluidizing gas;
   (3) heating the fluidized hydrate of aluminum chloride in the splitting zone partially to split the hydrate of aluminum chloride while in the splitting zone;
   (4) cycling partially split aluminum chloride from the splitting zone to the turbulent zone;
   (5) fluidizing the solids in the turbulent zone by introduction of gas from the cooling zone to the lower portion of the turbulent zone;
   (6) heating the fluidized solids in the turbulent zone to advance the splitting reaction;
   (7) cycling the heated solids from the turbulent zone to the residence zone for further completion of the splitting of the hydrate of aluminum chloride to aluminum oxide;
   (8) recycling a portion of the solids from the residence zone to the turbulent zone for admixture with the partially split aluminum chloride from the splitting zone;
   (9) passing the remainder of the solids from the residence zone to the cooling zone for passage in heat exchange relation with fluidizing gas to yield a preheated gas fed to the turbulent zone and a cooled aluminum oxide as product; and
   (10) recycling a portion of the solids from the turbulent zone to the splitting zone for supply of heat to the splitting zone and for admixture with the hydrate of aluminum chloride introduced into the splitting zone.

2. The method as claimed in claim 1, in which the splitting comprises two turbulent layer stages, in the first of which heat is supplied by individual exchange with heating surfaces and in the second of which heat is supplied by hot calcined material recycled from the residence zone.

3. The method as claimed in claim 1 in which the density of hydrate of aluminum chloride in the splitting zone is within the range of 300 to 600 kg/m$^3$, and the turbulent gas velocity is below 0.8 m/sec.

4. The method as claimed in claim 1, in which the density of hydrate of aluminum chloride is within the range from 40 to 250 kg/m$^3$ and the turbulent gas velocity is within the range of 1.5 to 5 m/sec.

5. The method as claimed in claim 1, in which the fluidizing gas in the splitting zone is steam.

6. The method as claimed in claim 1 in which when the hydrate of aluminum chloride is partially split in a single-stage the temperature in the splitting zone is within the range of 200°–450° C. and when in a two-stage process the temperature is within the range of 150°–300° C. in the first stage and up to about 600° C. in the second stage.

7. The method as claimed in claim 1, in which the degree of splitting in the splitting stage is at least 80%.

8. The method as claimed in claim 1, in which the average suspension density within the residence zone is above 500 kg/m$^3$.

9. The method as claimed in claim 1, in which the average residence time of solids within the turbulent zone is 10 to 30 minutes.

10. The method as claimed in claim 1, in which the average residence time of solids within the residence zone is 2 to 20 times the average residence time within the turbulent zone.

11. The method as claimed in claim 1 which includes the steps of:
    (11) passing a secondary gas into a portion of the turbulent zone above the level at which the fluidizing gas is introduced into the turbulent zone; and
    (12) introducing a fuel into a portion of the turbulent zone between the introduction of a secondary gas and the fluidizing gas.

12. The method as claimed in claim 11 which includes the step of:
    (13) passing the secondary gas in heat exchange relation with the aluminum oxide from the residence zone before entry into the turbulent zone.

13. The method as claimed in 11, in which within the turbulent zone an average suspension density of 20 to 300 kg/m$^3$ is established in the region between the introduction of fluidizing gas and the secondary gas, and an average suspension density is 1 to 20 kg/m$^3$ in the region above the introduction of secondary gas.

14. The method as claimed in claim 11, in which the volume ratio of secondary gas supplied to the turbulent zone to fluidizing gas is within the range of 10:1 to 1:2.

15. The method as claimed in claim 11, in which the temperature of the gases emerging from the turbulent zone is lowered by direct contact with hydrate of aluminum chloride, the greater part of which has been split.

* * * * *